United States Patent
Wildig

(10) Patent No.: US 10,386,098 B2
(45) Date of Patent: Aug. 20, 2019

(54) HEATING AND COOLING NETWORK FOR BUILDINGS

(75) Inventor: Thomas Wildig, Sollentuna (SE)

(73) Assignee: SENS GEOENERGY STORAGE AB, Nacka (SE)

(*) Notice: Subject to any disclaimer, the term of this patent is extended or adjusted under 35 U.S.C. 154(b) by 158 days.

(21) Appl. No.: 12/991,158

(22) PCT Filed: May 7, 2009

(86) PCT No.: PCT/SE2009/050498
§ 371 (c)(1),
(2), (4) Date: Jan. 5, 2011

(87) PCT Pub. No.: WO2009/139699
PCT Pub. Date: Nov. 19, 2009

(65) Prior Publication Data
US 2011/0108233 A1    May 12, 2011

(30) Foreign Application Priority Data

May 15, 2008   (SE) ..................... 0801107

(51) Int. Cl.
*F24J 3/08*       (2006.01)
*F25B 30/06*    (2006.01)
(Continued)

(52) U.S. Cl.
CPC .......... *F25B 30/06* (2013.01); *F24D 11/0207* (2013.01); *F24D 2200/11* (2013.01);
(Continued)

(58) Field of Classification Search
CPC ............. F24D 11/0207; F24D 2200/11; F24D 2200/12; F24J 3/081; Y02E 10/12;
(Continued)

(56) References Cited

U.S. PATENT DOCUMENTS 4,157,730 A * 6/1979 Despois ................ E21B 43/305
  165/45
4,375,831 A * 3/1983 Downing, Jr. ...... F24D 11/0214
  165/48.1

(Continued)

FOREIGN PATENT DOCUMENTS

CA      2541378 A1   9/2006
CN      87107689 A   5/1988
(Continued)

OTHER PUBLICATIONS

International Search Report, dated Jun. 16, 2009, from corresponding PCT application.
(Continued)

*Primary Examiner* — Frantz F Jules
*Assistant Examiner* — Martha Tadesse
(74) *Attorney, Agent, or Firm* — Young & Thompson

(57) ABSTRACT

Device for heating and cooling, respectively, more than one house, where at least two small houses (1) are connected to a common energy storage (2) in the ground and where a control device (3) is arranged to transport a heat carrier in a pipe work (4) connected to the energy storage (2). The small houses (1) are each arranged to have a separate respective heat pump device, and in each heat pump device is connected to the pipe work (4), so that, firstly, the heat carrier can flow through the heat pump device and, secondly, the small houses (1) are connected in parallel in relation to each other to the pipe work (4).

10 Claims, 3 Drawing Sheets

(51) Int. Cl.
  *F24D 11/02* (2006.01)
  *F25B 29/00* (2006.01)
  *F24T 10/10* (2018.01)

(52) U.S. Cl.
  CPC ...... *F24D 2200/12* (2013.01); *F24D 2220/20* (2013.01); *F24T 10/10* (2018.05); *F25B 29/00* (2013.01); *F25B 2400/24* (2013.01); *Y02B 10/40* (2013.01); *Y02B 30/125* (2018.05); *Y02B 30/17* (2018.05); *Y02E 10/12* (2013.01); *Y02P 80/14* (2015.11)

(58) Field of Classification Search
  CPC ....... Y02E 20/14; Y02B 30/126; Y02B 10/40; F25B 30/06; F25B 29/00; F25B 2400/24
  USPC .................. 62/79, 260, 324.1, 238.1; 165/45
  See application file for complete search history.

(56) References Cited

U.S. PATENT DOCUMENTS

| | | | | |
|---|---|---|---|---|
| 4,397,152 A * | 8/1983 | Smith | ................ | F03G 6/065 60/641.15 |
| 4,796,439 A | 1/1989 | Yamada et al. | | |
| 4,949,547 A * | 8/1990 | Shimizu | ................ | F24F 5/0003 62/238.7 |
| 5,992,507 A | 11/1999 | Peterson et al. | | |
| 7,451,612 B2 * | 11/2008 | Mueller | ................ | F24D 15/04 62/260 |
| 7,566,980 B2 * | 7/2009 | Fein | ................ | H02S 10/12 290/2 |
| 2006/0201179 A1 * | 9/2006 | Kidwell | ................ | C10L 3/10 62/260 |
| 2006/0213637 A1 * | 9/2006 | Laroche | ................ | F24D 11/002 165/45 |
| 2007/0214815 A1 * | 9/2007 | Lewkowitz | ........... | F25B 27/002 62/235.1 |
| 2009/0084518 A1 * | 4/2009 | Panula | ................ | F16L 9/19 165/45 |
| 2009/0084519 A1 * | 4/2009 | Panula | ................ | F24J 3/081 165/45 |
| 2010/0064709 A1 * | 3/2010 | Giertz | ................ | F25B 13/00 62/238.7 |
| 2010/0281907 A1 * | 11/2010 | Giertz | ................ | F25B 13/00 62/324.6 |
| 2010/0307734 A1 * | 12/2010 | Wildig | ................ | F28D 20/0052 165/287 |
| 2012/0279681 A1 * | 11/2012 | Vaughan | ................ | F24D 10/003 165/62 |

FOREIGN PATENT DOCUMENTS

| | | |
|---|---|---|
| CN | 1576740 A | 2/2005 |
| DE | 2930484 A1 | 2/1981 |
| DE | 299 12 994 U1 | 11/1999 |
| DE | 202007017967 U1 | 3/2009 |
| GB | 2 332 048 A | 6/1999 |
| JP | 61276639 A | 12/1986 |
| JP | 01196468 A * | 8/1989 |
| JP | 01196468 A * | 8/1989 ............ F24F 5/0003 |
| JP | 200548972 A | 2/2005 |
| JP | 2005048972 A * | 2/2005 |
| JP | 2005048972 A * | 2/2005 |
| JP | 2005-164051 A | 6/2005 |
| JP | 2006234376 A * | 9/2006 |
| SE | 530722 C2 | 8/2007 |
| WO | 83/01272 A1 | 4/1983 |
| WO | 2007030938 A1 | 3/2007 |
| WO | 2007097701 A1 | 8/2007 |
| WO | 2007107629 A1 | 9/2007 |

OTHER PUBLICATIONS

Extended European search report (EESR), dated Jun. 2, 2016, from corresponding patent application EP 09746859.9.

* cited by examiner

HEATING AND COOLING NETWORK FOR BUILDINGS

The present invention relates to a method and a device for heating and/or cooling of a plurality of small houses.

Today, it is common for small houses to be heated by the use of so called geothermal heating, namely a heat pump connected to a heat carrier circulating in the ground. Such arrangements may in some cases also be used for cooling of small houses during the summer.

A common problem with such geothermal heating arrangements is that the ground around the bore hole, also called the energy well, during heating operation runs the risk of being cooled down more than what is necessary, which negatively affects the efficiency of the arrangement when the temperature is successively lowered locally in the ground as the heat carrier during heating operation during the winter cools the bore hole.

When doing new installations, it becomes more difficult as more proprietors of small houses in a given area install geothermal heating to respect the prescribed distance, usually about 30 meters, between two neighboring bore holes for these not to negatively affect each other thermally. For example, this may lead to general cooling of the ground in a densely built-up area, in turn decreasing efficiency of the arrangements.

In order to avoid these problems, it is possible to install one geothermal heating arrangement common to several properties, which exploits one or several common bore holes. This way, increased control over the flow of heat carrier in the hole or holes can be achieved, whereby the effects of the above described problems may be mitigated.

Such a system can be comprised of a central heat pump from which heat or coldness is distributed to the connected properties in the form of distant heating or distant cooling.

However, such systems only allow either heating or cooling operation at any one instance in time. For instance, this means that a separate system must be installed in order to provide for simultaneous cooling of indoor air in the connected properties and heating of tap water. This is also the case if certain house proprietors want to heat the indoors air at the same time as others want to cool the air, something which can be imagined for example when the temperature of the outdoors air is close to 20 degrees.

Moreover, the installation as well as maintenance of a central heat pump and distribution arrangement is costly.

The present invention solves the above described problems.

Thus, the invention relates to a device for heating and cooling, respectively, of more than one house, where at least two small houses are connected to a common energy storage in the ground and where a control device is arranged to transport a heat carrier in a pipe work connected to the energy storage, and is characterised in that the small houses each are arranged having a separate respective heat pump device, and in that each heat pump device is connected to the pipe work, so that, firstly, the heat carrier can flow through the heat pump device and, secondly, the small houses are connected in parallel in relation to each other to the pipe work.

In the following, the invention will be described in detail, with reference to exemplifying embodiments of the invention and to the appended drawings, where:

Figure 1:
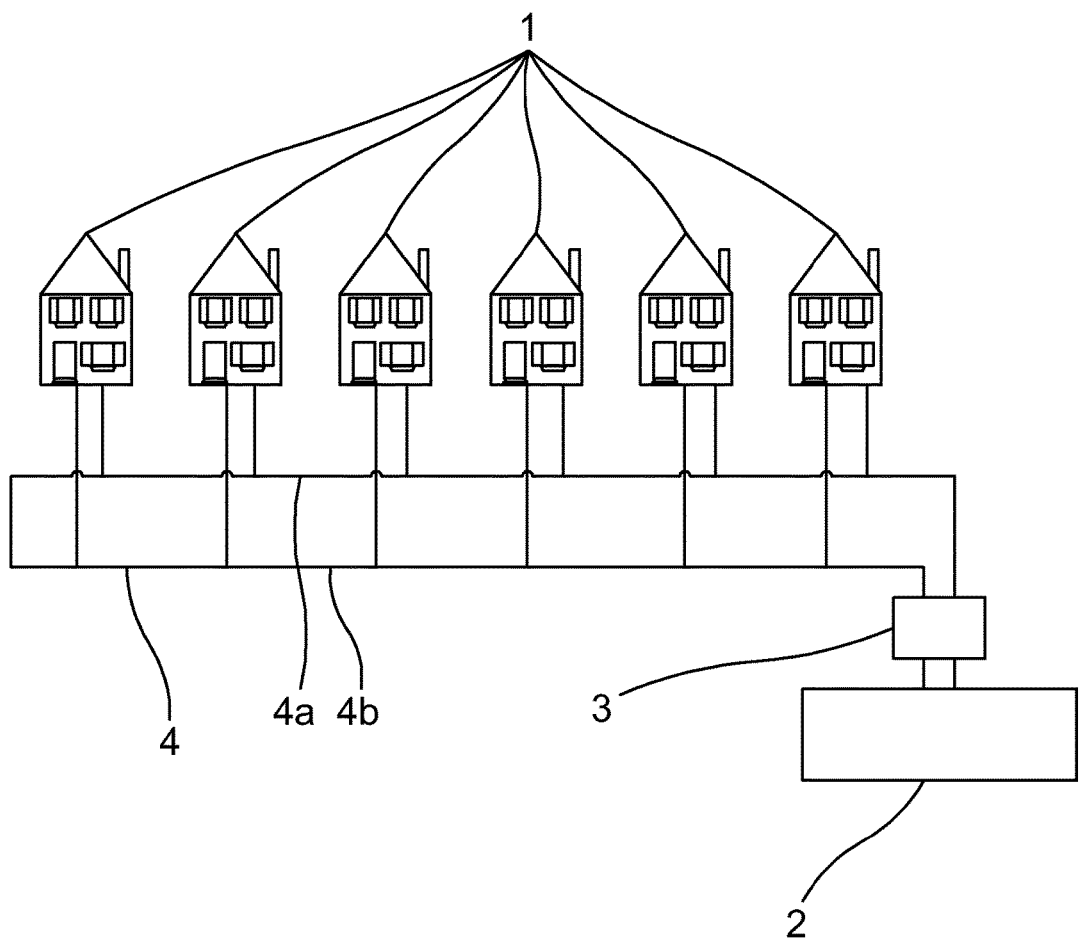
FIG. 1 is an explanatory sketch which illustrates an area of small houses and an energy storage according to the present invention.

In FIG. 1, a number of small houses 1 are shown, all being connected to a common energy storage 2. The number of small houses 1 may vary, but in order to achieve the purposes of the invention at least two small houses must be connected to the energy storage 2. Furthermore, the present inventors have discovered that a number of between about 10 and 100 small houses of average size, or the corresponding building volumes, can be heated and/or cooled using on single common energy storage 2 in an especially efficient way.

The energy storage 2 consists of a number of holes arranged in the ground, by way of example in the form of drilled holes. The energy storage 2 may be constructed in a suitable location with respect to the disturbances accompanying such an installation, and to access possibilities during subsequent maintenance work. It is preferred that the energy storage 2 is constructed in the vicinity of the small houses in a common or non-built up area, such as on a piece of grass-covered land, for example in a park or in a grove.

A control device 3 is arranged to control the transport of a heat carrier in a pipe work 4 connected to the small houses 1 as well as to the energy storage 2. The heat carrier may be of a suitable, conventional type, such as water with the addition of anti-freeze agent. It is preferred that the pipe work 4 is comprised of a closed system in which the heat carrier is transported.

Each small house 1 is equipped with an own respective heat pump device. Moreover, each small house 1 is connected to the pipe work 4 in such a manner so that the small houses are connected in parallel to the pipe work 4 in relation to each other, and therefore also to the energy storage 2. Such parallel connection can, for example, be achieved by arranging two main conduits 4a, 4b for heat carrier, whereof one at a given point in time is arranged to convey heat carrier from the energy storage 2 and the other one at a given point in time is arranged to convey heat carrier back to the energy storage 2, and where the two main conduits 4a, 4b are interconnected at their respective distant ends, so that the heat carrier is first led out from the energy storage 2 through a first of the main conduits and thereafter immediately back to the energy storage 2 through a second main conduit. Thereafter, each respective small house 1 may be connected to both the first and second main conduits, so that heat carrier is drawn from the first and led back via the second main conduit. Of course, other suitable pipe work configurations may also be used, such as in the form of more than two main conduits and so forth.

The pipe work 4 and the respective heat pump device in each small house 1 are thus arranged so that heat carrier is conveyed through the respective heat pump arrangement, from the first main conduit to the second. Hence, if a reversible heat pump device is used in a certain small house, the heat pump device may, by adding or removing thermal energy to or from the heat carrier flowing through the heat pump device, generate coldness or heat, which in turn may be used locally in the small house for, by way of example, cooling of the indoors air or heating of the air or tap water. If the heat pump device is not reversible, it may be arranged to either generate only heat or only coldness by the help of the heat carrier flowing through it.

Since the small houses 1 are connected in parallel to the energy storage 2, the thermal influence of an individual small house on the heat carrier, as a consequence of mixing with return heat carrier from the small house in question with the rest of the heat carrier flowing in the main conduit, will to merely limited extent affect the temperature of the heat carrier as this reaches the rest of the small houses. This is true regarding both heating and cooling operation in each respective small house.

In other words, an individual small house will only to a limited extent affect the temperature in the heat carrier which is conveyed to other small houses, independently of if the small house in question adds or removes thermal energy from the heat carrier. Since the energy storage consists of a number of holes drilled into the ground through which the heat carrier is conveyed, the heat carrier flowing out from the energy storage will hold an approximately constant temperature, essentially corresponding to the mean annual temperature for the geographical location at hand. Thus, certain houses may exploit the heat carrier flowing through their respective heat pump device for cooling, at the same time as other houses are operated for heating. The temperature of the return heat carrier to the energy storage 2 is determined by the total added and exploited thermal energy, respectively, in all connected small houses 1.

By using a central energy storage 2 for several small houses 1, rather than using a local energy storage for each respective small house, which is the situation when each small house 1 has a separate geothermal heating arrangement, the advantage is achieved that the energy balance of the ground can be better maintained. Specifically, the throughput of heat carrier through the various respective energy wells of the energy storage 2 will be controllable, so that the ground around individual energy wells is not cooled so much so that the efficiency runs the risk of being deteriorated more than what is necessary, even during heavy and long-term heating operation in the small houses. Moreover, the efficiency in the heat pump devices may be increased during heating operation, since the average temperature of the heat carrier can be higher.

By connecting each small house in parallel to the energy storage 2, one achieves that no major losses arise between two neighboring small houses. Also, and as mentioned above, each small house may at each instance in time be set optionally for heating or cooling operation, independently of the mode of operation for the rest of the small houses. This is especially useful during the summer, when there for example is a general desire for hot water at the same time as certain small houses require cooled indoors air. For example, alternating operation between heating of tap water and cooling of indoors air may be desirable. In these specific cases, the thermal energy taken from the heat carrier to produce hot water can partly correspond to the thermal energy being added to the heat carrier during cooling of the indoors air.

By arranging a separate heat pump arrangement in each respective small house, the advantage is achieved that heat pumps of standard type may be used, implying comparatively cheap and quick installations, good access to cost efficient maintenance and spare parts as well as large flexibility in terms of for example function and dimensioning of the heating/cooling system in each individual house.

Figure 2:
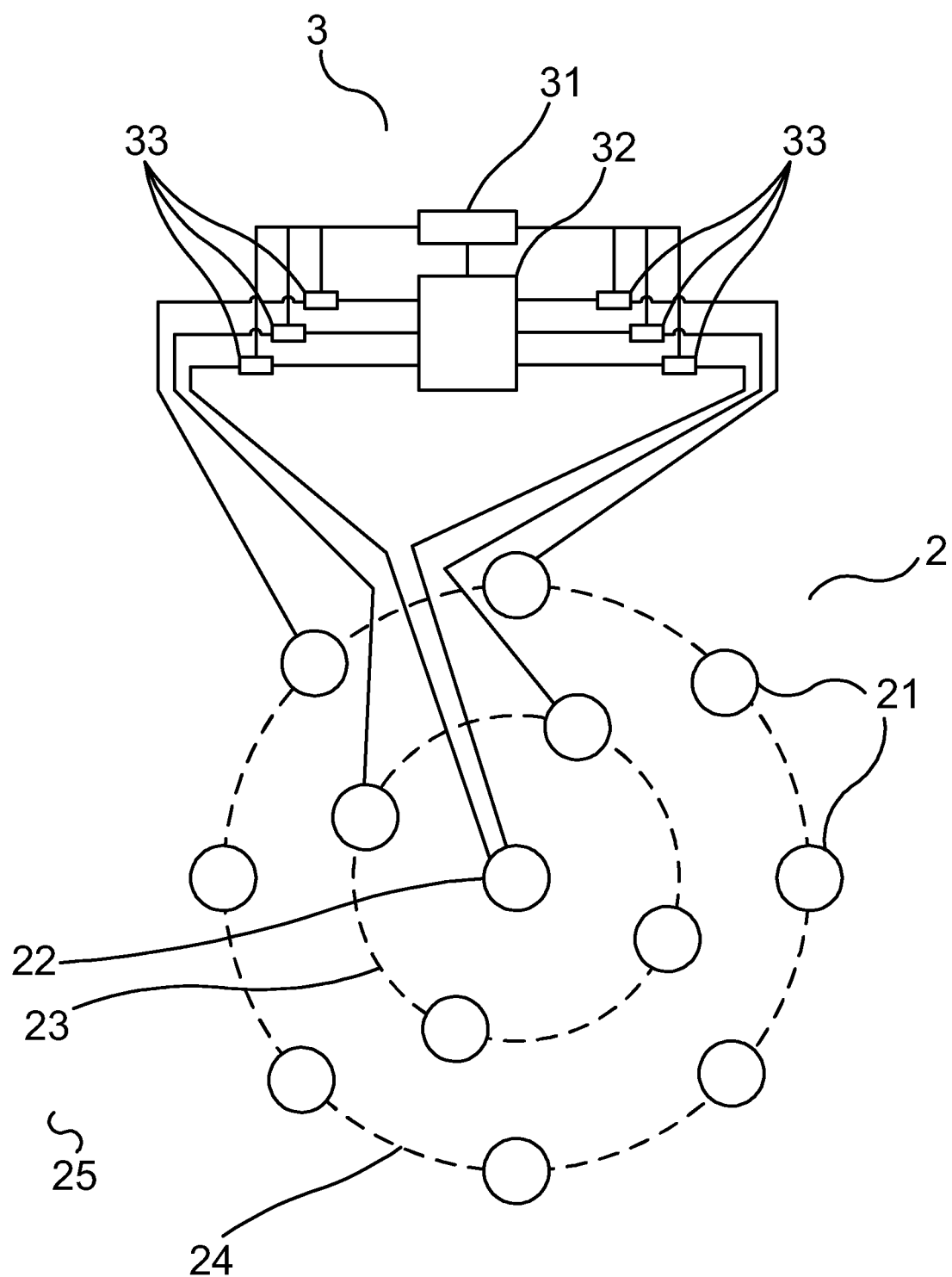
FIG. 2 is an explanatory sketch which in closer detail shows an energy storage according to the present invention.

In order to increase efficiency in the energy storage 2 as much as possible, it is preferred that an energy storage of the type described in the Swedish patent application no. 0600428-7 is used. Such an energy storage 6 is illustrated in FIG. 2.

According to a preferred embodiment, the energy storage 2 comprises at least four energy wells 21, through which the control device 3 is arranged to circulate the heat carrier in a closed system and thereby heating or cooling, respectively, the ground 25 around the respective energy wells 21. The energy wells 21 are arranged essentially along at least two concentric circles 22, 23, 24. In the FIG. 2, three concentric circles 22, 23, 24 are shown, whereof the innermost circle 22 only comprises one single energy well.

The control device 3 comprises a control member 31, arranged to control a first valve system 32, in turn arranged to control the heat carrier to energy wells arranged along a certain circle, and thereby heating or cooling, respectively, the ground along the circle in question. Along each respective circle 22, 23, 24, a conduit runs, in which the heat carrier can flow from the valve system 32, via the energy wells arranged along the circle in question one by one, and finally back to the valve system 32.

A number of temperature sensors 33 are arranged along each outflow- and return flow conduit, respectively, of each respective circle 22, 23, 24, which temperature sensors 33 are connected to the control member 31. Thereby, the control member 31 can control the first valve system 32 so that the heat carrier is only circulated through a certain circle or several certain circles, depending on the operation conditions.

Thus, the control device 3 is arranged so that the control member 31, via the first valve system 32, controls the heat carrier so that inner circles are heated before outer circles when the temperature of the heat carrier is higher than the temperature of the surrounding ground 25, that is when the small houses 1 on average are operated for cooling of the indoors air. Inversely, the heat carrier is controlled so that outer circles are cooled before inner circles when the temperature of the heat carrier is lower than the temperature of the ground 25, that is when the small houses 1 on average are operated for heating of the indoors air and/or hot water.

The above described main conduits are connected to the first valve system 32, so that the heat carrier is distributed to the small houses 1 (not shown in FIG. 2).

By arranging the energy storage 2 in this way, the advantage is achieved that stored heat or coldness efficiently can be exploited for later needs, as described in the above mentioned Swedish patent application. As a consequence, the energy balance in the common energy storage 2 can be maintained in a considerably more efficient way than what is the case when several small houses have their own geothermal heating arrangements, not operated with a common supervision and control over the tapping-off of heat and coldness. Notably, major economic gains are achieved since it is possible to efficiently store thermal energy generated during cooling of indoors air in the energy storage 2 during the summer season, and then to again exploit this stored thermal energy from the energy storage 2 for heating during winter.

In order to fully benefit from the advantages of the present invention, it is preferred that at least one of the heat pump devices arranged in the small houses 1 is arranged to optionally be able to generate heat or coldness for local use in the small house in the form of heating of indoors air and/or tap water or cooling of indoors air. As a result, advantageously each respective small house may independently exploit heat as well as coldness from the energy storage 2, independently of the current mode of operation for the rest of the small houses.

Figure 3:
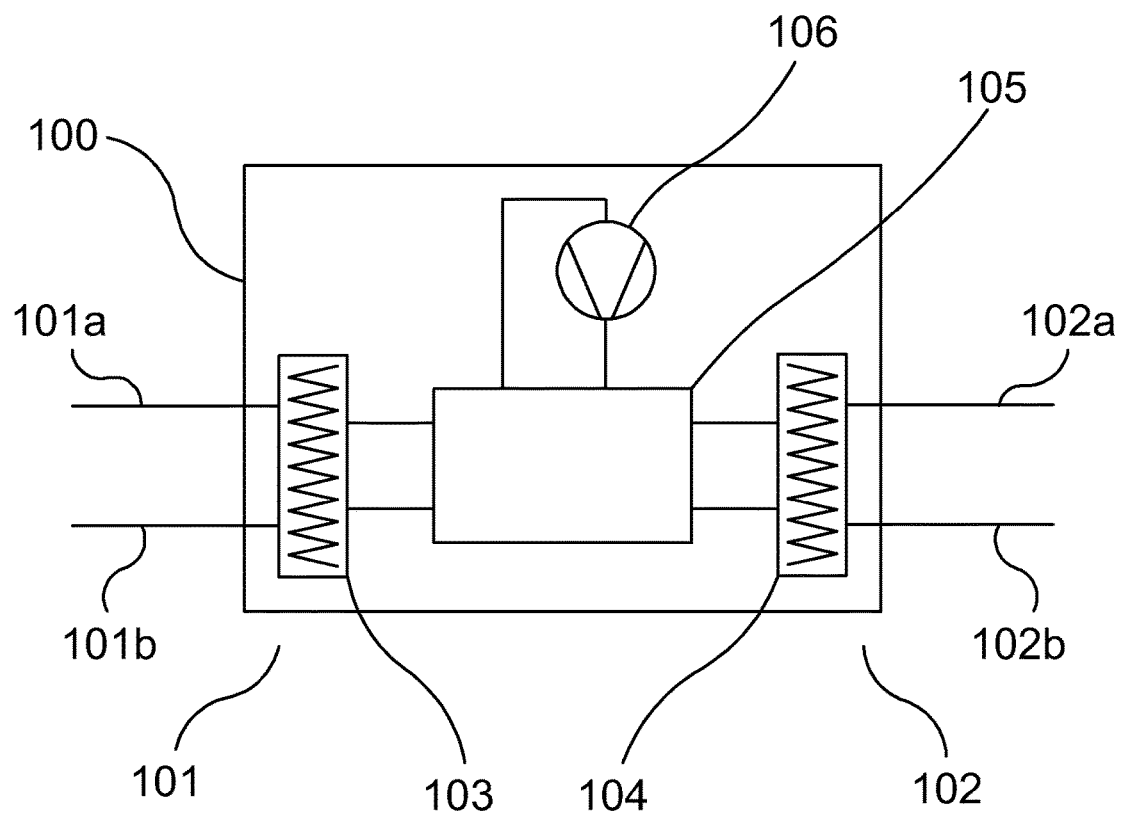
FIG. 3 is an explanatory sketch which in closer detail shows a heat pump device according to the present invention.

According to a preferred embodiment, to this end is used a reversible heat pump device of the type described in the Swedish patent application no. 0602688-4. Such a heat pump device 100 is depicted in simplified form in FIG. 3.

The heat pump device 100 comprises two sides 101, 102, whereof during operation one side is a cold side and the other side is a warm side. The side 101 is, via conduits 101a, 101b, connected to the energy storage 2. The side 102 is, via conduits 102a, 102b, connected to a heating/cooling unit (not shown). During heating operation, the side 102 is the warm side and the heating/cooling unit is arranged to heat the indoors air in the small house in question, or hot water, in a manner which is conventional per se. At the same time, the side 101 is in this case the cold side. During cooling operation, the side 102 is instead the cold side, and the heating/cooling unit is arranged to cool the indoors air. At the same time, the side 101 is the warm side. Thus, the sides 101, 102 can switch roles with each other in a way which is more closely described in the above mentioned Swedish patent application, and also in the following.

A respective heat exchanger 103, 104 is connected to each of the said sides 101, 102. A second valve system 105, comprising an expansion valve (not shown), is connected to each of the respective heat exchangers 103, 104. Furthermore, a compressor 106 is connected to the second valve system 105. The second valve system 105 is arranged to optionally connect the warm or the cold side of the heat pump device 100 to the heating/cooling unit, whereby the heating/cooling unit optionally can emit heat or coldness. This is achieved by the second valve system 105 being arranged to interconnect the heat exchangers 103, 104, the compressor 106 and the expansion valve so that a closed loop is formed in the heat pump device, through which loop a second heat carrier is circulated so that heat pump action is obtained by the aid of the compressor 106 in combination with the expansion valve and the heat exchangers 103, 104. Using such a valve system to reverse the flow direction of the second heat carrier, a reversal of which side is warm and which side is cold in the heat pump device 100 is also achieved.

The heat pump device is of the type liquid-liquid. This results in a number of advantages, such as the possibility to efficiently heat several rooms at the same time and a low degree of condensation during operation in warmer climates.

Such a heat pump device 100 is thus reversible, and offers very good efficiency and economy both during heating and cooling operation. It is preferred that at least one of the small houses 1, preferably several and most preferably all of the houses 1, are equipped with a heat pump device 100 of this type, since the use of efficient and reversible heat pump devices together with a common energy storage 2 according to the present invention, to which a number of small houses 1 are connected in parallel, makes it possible to obtain a good energy balance more easily for the system as a whole.

It is preferred that at least one of the heat pump devices arranged in the small houses during heating operation is arranged to lower the temperature of the heat carrier by about 3 to 4° C.

Analogously, it is preferred that at least one of the heat pump devices arranged in the small houses during cooling operation is arranged to rise the temperature of the heat carrier by about 3 to 4° C.

Hence, by using the present invention one achieves efficient and cheap heating and cooling, respectively, of several small houses, whereby the risk of poor coefficient of utilization is lower than what is the case when using conventional art. Moreover, the advantage is achieved that different small houses that are connected to the system can optionally tap off heat or coldness according to need, without having to take into consideration the usage pattern of the neighbors. Finally, a system is obtained which to a large extent consists of commercially available standard components, with the therewith associated advantages in terms of cost efficiency, maintenance and availability of spare parts, flexibility and so forth.

Above, preferred embodiments have been described. However, it is apparent for the skilled person that many modifications may be made to the described embodiments without departing from the idea of the invention. Thus, the invention is not to be limited by the described embodiments, but to be variable within the scope of the enclosed claims.

The invention claimed is:

1. A device for heating and cooling of more than one house, wherein:
   at least two houses are connected to a common energy storage in a ground that is in thermal contact with the ground, the common energy storage comprising an array of bore holes formed in the ground,
   a control device is arranged to transport a heat carrier in a pipe work connected to the common energy storage, the houses are each arranged having a separate respective heat pump device, a plurality of which are of reversible liquid-liquid type and are arranged to selectively heat or cool an indoor air of their respective houses, and
   each said heat pump device is connected to the pipe work, so that the heat carrier flows through the heat pump device,
   wherein each said heat pump device of the reversible liquid-liquid type comprises external liquid conduits connected to a respective heating/cooling unit,
   wherein said heat pump devices are connected in parallel in relation to each other to the pipe work by way of,
   firstly, the pipe work comprising two main conduits for the heat carrier, said two main conduits being interconnected at their respective distant ends to the common energy storage, one of said main conduits being arranged to convey the heat carrier from the common energy storage and the other one to thereafter convey the heat carrier back to the common energy storage, and,
   secondly, each respective one of said heat pump device being connected to, on the one hand, one of the main conduits from which the heat carrier is conveyed to the respective heat pump device, and on the other hand to the other main conduit via which the heat carrier is again conveyed back to the common energy storage, and
   at least one of said heat pump devices is configured to cool a one of the houses served by said at least one heat pump device at the same time as at least one other said heat pump device is operated for heating one other of the houses served by said at least one other heat pump device.

2. The device according to claim 1, characterized in that the array of bore holes formed in the ground comprises at least four energy wells, through which the control device is arranged to circulate the heat carrier in a closed system and to thereby heat or cool, respectively, the ground, in that the energy wells are arranged essentially along at least two concentric circles, in that the control device comprises a control member, arranged to control a first valve system, which in turn is arranged to direct the heat carrier to the energy wells arranged along a circle and to thereby heat or cool, respectively, the ground along the circle, and in that the control member is arranged to control the first valve system so that, when a temperature of the heat carrier is higher than a temperature of a surrounding ground, inner circles are heated before outer circles, and, when the temperature of the heat carrier is lower than the temperature of the ground, the outer circles are cooled before the inner circles.

3. The device according to claim 1, characterized in that the said at least one heat pump device comprises two sides whereof one is a cold side and one is a warm side, in that heat exchangers are connected to the said cold side and to the said warm side, respectively, in that one of the heat exchangers is connected to the heating/cooling unit, in that other one of the heat exchangers is connected to the pipe work, in that a second valve system is arranged to be able to connect the warm or the cold side of the heat pump device to the heating/cooling unit, whereby the heating/cooling unit is configured to emit heat or coldness, and in that the heat pump device in question is of the type liquid-liquid.

4. The device according to claim 1, characterized in that the number of houses that are connected to the common energy storage is between 10 and 100.

5. A method for heating and cooling, respectively, of more than one house, where at least two houses are caused to be connected to a common energy storage in a ground, the common energy storage comprising an array of bore holes formed in the ground, comprising transporting, under control of a control device, a heat carrier in a pipe work connected to the common energy storage, where the houses each are caused to be equipped with a separate respective heat pump device, and where each said heat pump device is caused to be connected to the pipe work, so that the heat carrier is caused to flow through the heat pump device, wherein said heat pump devices are caused to be connected in parallel in relation to each other to the pipe work by way of, firstly, the pipe work being caused to be arranged to comprise two main conduits for the heat carrier, said two main conduits being caused to be interconnected at their respective distant ends in relation to the common energy storage, one of said main conduits being caused to be arranged to convey the heat carrier from the common energy storage and the other one to thereafter convey the heat carrier back to the common energy storage, and, secondly, each respective said heat pump device being caused to be connected to, on the one hand, one of the main conduits from which the heat carrier is conveyed to the respective heat pump device, and on the other hand to the other main conduit via which the heat carrier is again conveyed back to the common energy storage, and wherein a plurality of the heat pump devices are reversible liquid-liquid type heat pumps devices arranged to selectively heat or cool an indoor air of their respective houses, wherein each said heat pump device of the reversible liquid-liquid type comprises external liquid conduits connected to a respective heating/cooling unit, and at least one of said heat pump devices is configured to cool one of the houses served by said at least one heat pump device at the same time as at least one other heat pump device is operated for heating one other of the houses served by said at least one other heat pump device.

6. The method according to claim 5, characterized in that the array of bore holes formed in the ground comprises at least four energy wells, through which the control device is caused to circulate the heat carrier in a closed system and to thereby heat or cool, respectively, the ground, in that the energy wells are caused to be arranged essentially along at least two concentrical circles, in that the control device is caused to comprise a control member, which is caused to control a first valve system, which in turn is caused to direct the heat carrier to the energy wells arranged along a circle and to thereby heat or cool, respectively, the ground along the circle, and in that the control member is caused to control the first valve system so that, when a temperature of the heat carrier is higher than a temperature of a surrounding ground, inner circles are heated before outer circles, and, when the temperature of the heat carrier is lower than the temperature of the ground, outer circles are cooled before inner circles.

7. The method according to claim 5, characterized in that the said at least one heat pump device is caused to comprise two sides whereof one is caused to be a cold side and one is caused to be a warm side, in that heat exchangers are caused to be connected to the said cold side and to the said warm side, respectively, in that one of the heat exchangers is caused to be connected to the heating/cooling unit, in that other one of heat exchangers is caused to be connected to the pipe work, in that a second valve system is able to connect the warm or the cold side of the heat pump device to the heating/cooling unit, whereby the heating/cooling unit is configured to emit heat or coldness, and in that the heat pump device in question is caused to be of the type liquid-liquid.

8. The method according to claim 5, characterized in that the number of houses being connected to the common energy storage is caused to be between 10 and 100.

9. The method according to claim 5, characterized in that the said at least one heat pump device is caused to lower the temperature of the heat carrier during heating operation with about 3-4° C.

10. The method according to claim 5, characterized in that the said at least one heat pump device is caused to rise the temperature of the heat carrier during cooling operation with about 3-4° C.

* * * * *